(12) United States Patent
Rashwan

(10) Patent No.: US 9,311,669 B2
(45) Date of Patent: Apr. 12, 2016

(54) SYSTEM AND METHOD FOR SELLING A PRODUCT THROUGH AN ADAPTABLE PURCHASE INTERFACE

(71) Applicant: Kout Inc., San Francisco, CA (US)

(72) Inventor: Hany Rashwan, San Francisco, CA (US)

(73) Assignee: Ribbon Payments, Inc., San Francisco, CA (US)

( * ) Notice: Subject to any disclaimer, the term of this patent is extended or adjusted under 35 U.S.C. 154(b) by 413 days.

(21) Appl. No.: 13/871,976

(22) Filed: Apr. 26, 2013

(65) Prior Publication Data

US 2013/0290149 A1    Oct. 31, 2013

Related U.S. Application Data

(60) Provisional application No. 61/638,918, filed on Apr. 26, 2012.

(51) Int. Cl.
*G06Q 30/00* (2012.01)
*G06Q 30/06* (2012.01)

(52) U.S. Cl.
CPC ............ *G06Q 30/0641* (2013.01); *G06Q 30/06* (2013.01); *G06Q 30/0601* (2013.01)

(58) Field of Classification Search
CPC .......................................... G06Q 30/00–30/08
See application file for complete search history.

(56) References Cited

U.S. PATENT DOCUMENTS

| | | | |
|---|---|---|---|
| 7,974,889 B2 | 7/2011 | Raimbeault | |
| 2009/0248543 A1* | 10/2009 | Nihalani et al. | ................ 705/27 |
| 2011/0191206 A1* | 8/2011 | Kiarostami | ................ 705/26.8 |
| 2011/0238484 A1 | 9/2011 | Toumayan et al. | |
| 2012/0084133 A1* | 4/2012 | Ross et al. | ................ 705/14.27 |
| 2012/0123910 A1 | 5/2012 | George | |

* cited by examiner

*Primary Examiner* — Michael Misiaszek
(74) *Attorney, Agent, or Firm* — Jeffrey Schox; Diana Lin

(57) ABSTRACT

A system and method for providing online commerce that includes at an online commerce platform, configuring a product profile for selling; providing a URI link of the online commerce platform that is unique to the product profile; at the online commerce platform, receiving an HTTP request to the link; identifying a referral channel of the HTTP request; conditionally selecting a product purchase interface mode from a set of interface modes at least in part based on the referral channel; transmitting a response of the selected product purchase interface mode in reply to the HTTP request; and at the purchase interface, completing a purchase from the product purchase interface.

18 Claims, 17 Drawing Sheets

```
{ id : 53245,
product type : "physical",
name : "T-Shirt",
price : 10,
product-link : "http://www.example.com/F3Si5j" }
```

FIGURE 2 http://example.com/F3Si5j

T-Shirt $10.00

Payment
Card Number
Expiration          CV Code
1    2013

Contact Info
John Smith
name@email.com

Mailing Address
Street Address
City    State
Zip

130

Size
Choose...

BUY NOW

FIGURE 3 http://example.com/products/add

Product Details

- ● Physical
- ○ Digital
- ○ Service
- ○ Event
- ○ Donation
- ○ Other

Product Title

Product Description $ 0.00    # 1

○ Free    ○ Unlimited

Cover Photo   Upload

"Thank you" page (optional)

http://

"Canceled" page (optional)

http://

Add Product

FIGURE 8

```
...
<head>
  ...
  <meta property="medium" content="video">
  <meta property="og:title" content="Buy a T-Shirt for $10.00">
  <meta property="og:description" content="Buy a sweet shirt!">
  <meta property="og:type" content="video">

<meta property="og:url" content="https://example.com/F3Si5j">
  <meta property="og:video" content="https://www.example.com/FeedApp.swf?productId=tshirt">
  <meta property="og:video:type" content="application/x-shockwave-flash">
  <meta property="og:image" content="https://s3.amazonaws.com/rbn_prod/photos/9183/original/ribbonshirt.png?1364259601">
  <meta property="og:video:width" content="5000">
  <meta property="og:video:height" content="5000">
  <meta property="fb:admins" content="bob123,example1,smith2">

<meta name="twitter:card" content="product">
  <meta name="twitter:site" content="@ribbon">
  <meta name="twitter:url" content="https://example.com/F3Si5j">
  <meta name="twitter:title" content="Buy aT-Shirt for $10.00">
  <meta name="twitter:description" content="Buy a sweet shirt!">
  <meta name="twitter:image" content="https://s3.amazonaws.com/rbn_prod/photos/9183/thumb/ribbonshirt.png?1364259601">
  <meta name="twitter:image:width" content="460">
  <meta name="twitter:image:height" content="345">
  <meta name="twitter:data1" content="$10.00">
  <meta name="twitter:label1" content="Price">
  <meta name="twitter:data2" content="In Stock">
  <meta name="twitter:label2" content="Status">
</head>
...
```

SYSTEM AND METHOD FOR SELLING A PRODUCT THROUGH AN ADAPTABLE PURCHASE INTERFACE

CROSS-REFERENCE TO RELATED APPLICATIONS

This application claims the benefit of U.S. Provisional Application Ser. No. 61/638,918, filed on 26-Apr.-2012, which is incorporated in its entirety by this reference.

TECHNICAL FIELD

This invention relates generally to the e-commerce field, and more specifically to a new and useful system and method for selling a product through an adaptable purchase interface in the e-commerce field.

BACKGROUND

E-commerce has seen enormous growth in the past few decades. The prospect of buying a product online and having it shipped to one's address makes the process of buying and selling quick and easy. However, the process of buying and selling a product online often involves navigation through multiple web pages. In the process of selling, a user must often input data about his product on a third-party website such as ebay.com or craigslist.com. Posting a product to sell often involves navigation through many pages. The other option often involves building an entire online store. And once a product is added to a site, marketing usually involves organic searches for the product or expensive advertising of the product. Purchasing a product can be equally frustrating for customers on these online marketplaces. In the process of buying, users are often prompted to select a product on one page, add it to their shopping carts that are displayed on other pages, and then check out by providing their billing and delivery data on yet another series of pages. The time involved in this process can be especially costly and cumbersome when a user attempts to perform the buying transaction on a mobile device. Furthermore, when encountering a product on a social network or blog, purchasing the item often disrupts the user from their current activity on the social network or blog. For example, if a user posts a link to a product website in a content stream of a social network, a user is directed to that link outside of the social network after clicking the link. Thus, there is a need in the e-commerce field to create a new and useful system and method for selling a product through an adaptable purchase interface. This invention provides such a new and useful system and method.

BRIEF DESCRIPTION OF THE FIGURES

FIG. 2 is an exemplary model of a product;

FIG. 3 is an exemplary screenshot of a variation of a product purchase interface of a preferred embodiment;

FIG. 8 is an exemplary screenshot of an interface for configuring a product of a preferred embodiment;

FIG. 14 is an exemplary HTML code snippet that targets a media preview of a channel;

DESCRIPTION OF THE PREFERRED EMBODIMENTS

The following description of preferred embodiments of the invention is not intended to limit the invention to these preferred embodiments, but rather to enable any person skilled in the art to make and use this invention.

The system and methods for selling a product through an adaptable purchase interface of preferred embodiments use a link or product identifier as a mechanism for adapting purchase experiences to a current browsing activity or context of a user. In practice, the system and method is preferably implemented within an online commerce platform. A user can preferably add products for sale on the commerce platform, obtain a link for the product, and share the link anywhere in the internet. When users visit the link and/or when the link is posted in various online channels (e.g., websites, bogs, social networks, media sharing platforms, applications, etc.), the online commerce platform preferably generates an adaptive interface to facilitate purchase of the item. As a first feature, the product purchase interface is preferably targeted at a single product, and thus simplifies the checkout process. As a second feature, the product purchase interface is preferably customized for at least a set of different online channels (e.g., for a set of popular social networks). Merchants can sell products through the simple act of sharing the link. The system and method may be applied so that adaptive product purchase interfaces that are accessible through a single link can function across several channels (e.g., different social networks), devices (e.g., desktop computers and mobile devices), and/or applications. Preferably, several product purchase interfaces are implemented for different scenarios, and a user is routed to the most appropriate product purchase interface for the referring channel. The system and method functions to facilitate a product selling and purchasing experience that is usable throughout the internet.

1. System for Selling a Product Through an Adaptable Purchase Interface

Figure 1:
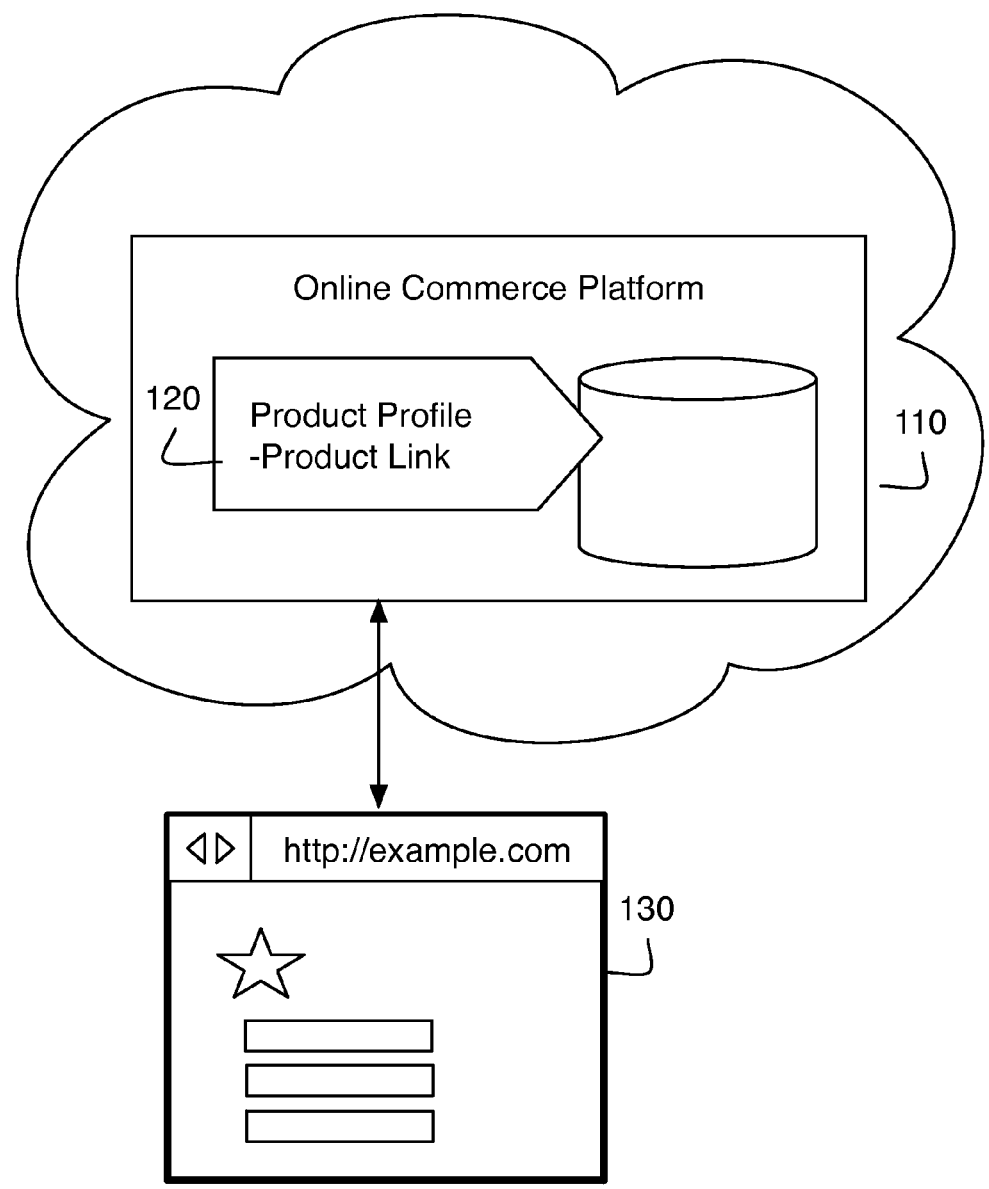
FIG. 1 is a schematic representation of a system of a preferred embodiment.

As shown in FIG. 1, a system for selling a product through an adaptable purchase interface of a preferred embedment can include an online commerce platform 110 that generates a product link 120. The online commerce platform preferably provides a product purchase interface 130, which in some situations is implemented in an embeddable product purchase interface 132. The system functions to manage the creation of product profiles, the sharing of product links 120, and purchasing of a product in the product purchase interface 130.

The online commerce platform 110 of a preferred embodiment functions as web-based service or application. The online commerce platform is preferably hosted in a distributed hosting environment, in a computing cluster, a managed hosting center, or any suitable network accessible computing system. The online commerce platform 110 preferably includes web servers and other services to manage requests and provide processing and storage tasks integral to the operation of the online commerce platform 110. The online commerce platform 110 additionally includes databases and/or interfaces to data storage systems. The online commerce platform 110 is preferably accessed through a web-based user interface such as a website. The online commerce platform 110 may alternatively be accessed through a native application that cooperatively communicates with the online commerce platform 110 possibly through an application programming interface (API). The online commerce platform 110 preferably includes an account system. The account system is preferably used by merchants and buyers. The accounts may be configured for particular roles (e.g., a merchant or a buyer). More preferably, an account with the online commerce platform no can be used for selling products and/or purchasing products. Database records of the online commerce platform 110 preferably maintain records for account information and product information. The account information preferably includes user name, email, social network account associations, profile image, billing information, shipping address, product orders, listed products, and/or any suitable information. Other suitable aspects of the online commerce platform 110 are additionally stored within the database system. The online commerce platform 110 additionally manages the assignment of product links 120 to product profiles. HTTP and other requests to access the product links 120 are preferably processed at the online commerce platform. Various generated or provided product purchase interfaces 130 can be configured to be rendered based on the context of the access request for a product link 120.

The product link 120 of the preferred embodiment functions to be a distributable mechanism for generating, producing, or serving a product purchase interface 130 that may be adapted for the referring channel. The product link 120 is preferably uniquely associated with a single product. Visiting the product link 120 preferably triggers the online commerce platform 110 to generate, produce, or serve a product purchase interface 130 specifically for buying the associated product. In one variation, the product link 120 may be uniquely associated with a set or collection of products. For example, a product link 120 may be created to buy three books. The product link 120 is preferably a URI or more specifically a URL. The URI is preferably for a domain managed by the online commerce platform 110. The product link 120 is preferably a sharable item that is configured to be shared by and between users. URIs are a preferred variation of a product link 120 as URIs are ubiquitously used in websites and native applications. The product link 120 is preferably shared on other channels. Channels can be outside websites, web applications, native applications, communication services (e.g., SMS, MMS, etc.), documents, devices, and/or any outside platform, application, or service.

The product link preferably includes a unique identifier in at least a portion of the link (e.g., in the path portion of the URI as shown in FIG. 2). The unique identifier is preferably a token or a string. The unique identifier may be random, created based on product identifying information, or assigned in any suitable manner. The unique identifier is preferably uniquely associated with a particular product. In alternative implementations, the unique identifier may be used as the shared mechanism through which adaptive purchase experiences may occur. The product link 120 is preferably a text string. The product link 120 may alternatively be a bar code, a QR code, or any suitable machine or human readable encoding of the link. The product link 120 is preferably a link to a page of the online commerce platform. The product link 120 may be one of a main domain name, a sub-domain, or a secondary-domain such as a shortened name of the main domain. For example, the product link 120 can include a shortened domain of the main domain of the online commerce platform 110. In one variation, a merchant may configure a customized domain name to be used with the online commerce platform 110. Preferably, the DNS settings are set by the merchant to point to the online commerce platform. Alternatively, the merchant configures the outside domain to conform to a protocol in routing network communication to the domain so that the link may be used to adaptively provide a purchase experience or use any suitable mechanism for managing the links. The product link may alternatively be any suitable mechanism for directing users between applications, sites, services or other suitable channels.

The product purchase interface 130 of the preferred embodiment functions to be a graphical user interface in which a user can complete a purchase. The product purchase interface 130 is preferably a checkout interface. More preferably, the product purchase interface 130 is preferably to purchase the product or products associated with the visited/activated product link 120. An online shopping cart is preferably not used within the online commerce platform, and thus visiting a product link signals an intent to buy the associated product(s) in the product purchase interface 130. For example, when a user clicks the link, the user will be directed to a purchase interface where the user can complete the order without having to add the product to a cart. As shown in FIG. 3, the product purchase interface preferably displays any relevant information concerning the product itself (photo, description, price), as well as fields for consummating the purchase of the product including a buyer name, buyer email address, buyer shipping/billing addresses, and the like. The product purchase interface 130 displayed can additionally include a button or link to complete or finalize the transaction. Preferably, the product purchase interface contains all pertinent and necessary information to inform the buyer about the product, collect the relevant financial and shipping information, and execute the terms of the purchase. The product purchase interface preferably functions to eliminate the multitude of web pages, scrolling, tabbing, windowing, and other inefficiencies associated with typical electronic commerce by presenting the entire terms of the transaction on a single unified interface for both the merchant and the buyer. The product purchase interface is preferably operable within a web page or applet, but may alternatively be operable within an application. The interaction flow, layout, and design of the interface can have any suitable design. The product purchase interface 130 is preferably customized according to the channel used to access the product link 120, which functions to dynamically conform the shopping experience to the previous activity of the user. In one exemplary scenario, a user may is browsing on a social network, reading news in a content stream, and spots a product link shared by a friend. When the user clicks the link, the online commerce platform preferably generates a product purchase interface 130 that is either integrated into the actual social network or that conforms to patterns of the social network. In either case, the product purchase interface is preferably simple and quick to complete. Upon completing the purchase, the browser of the user can additionally be redirected to the page of the social network where the link was accessed.

Figure 4:
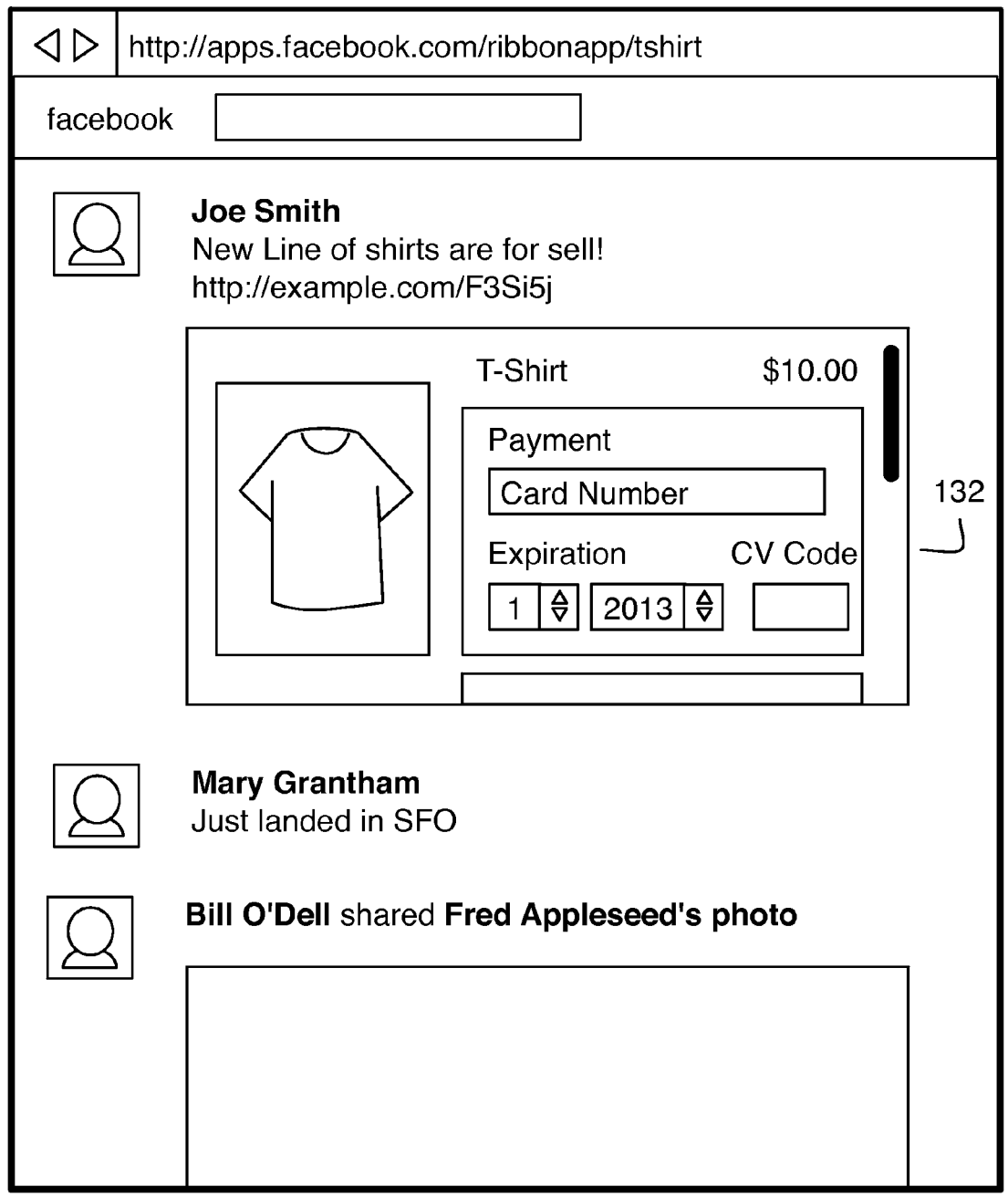
FIG. 4 is an exemplary screenshot of a variation of an in-stream product purchase interface for a social network channel of a preferred embodiment.
Figure 5:
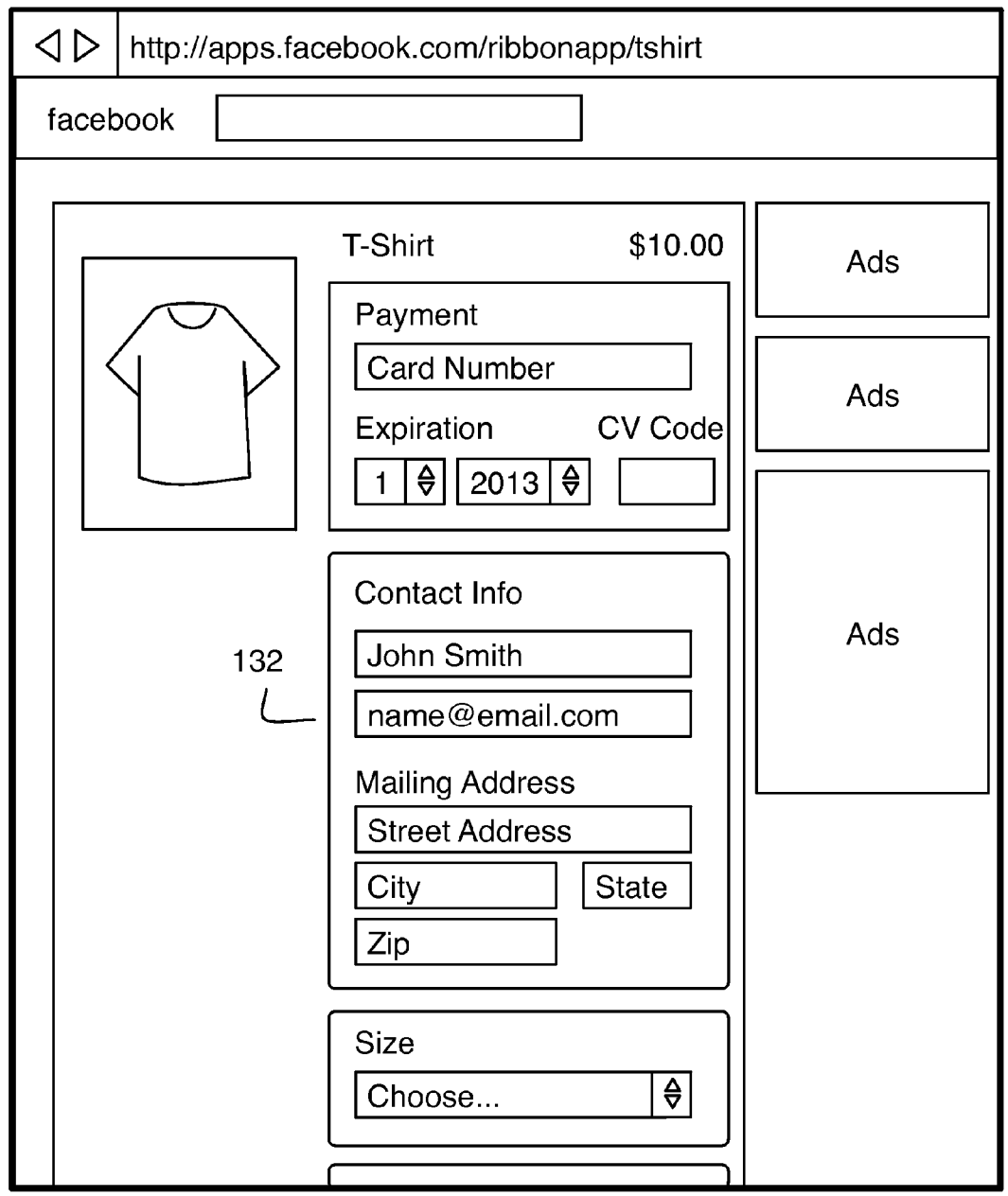
FIG. 5 is an exemplary screenshot of a variation of a channel application product purchase interface for a social network channel of a preferred embodiment.

In one variation, an embeddable purchase interface 132 may function as a product purchase interface 130 that directly integrates with the channel. The embeddable purchase interface may use embeddable code and/or a script to dynamically configure a product purchase interface within the channel. In another variation, open graph meta tags may be used by the online commerce platform 110 to generate an embeddable purchase interface 132 within the channel. The user, through the system and method of the preferred embodiment, may be able to purchase the related item directly in the content stream of the social network. For example, on Facebook a user could buy items directly in the news feed as shown in FIG. 4, or on Twitter, a user could buy items directly in a tweet stream. Similarly, a user may be able to visit a link in a social network website or app and be taken to an application within that social network to complete the purchase. For example, clicking the link in a Facebook post may direct a user to a Facebook application as shown in FIG. 5. In yet another example, a user may click a link from a popular website, and be directed to a webpage of the product link 120, and the webpage would be visually and/or functionally formatted to correspond to the referring website. The user is preferably alleviated from leaving the social network, adding an item to a cart, and then checking out.

2. Method for Selling a Product Through an Adaptable Purchase Interface

Figure 6:
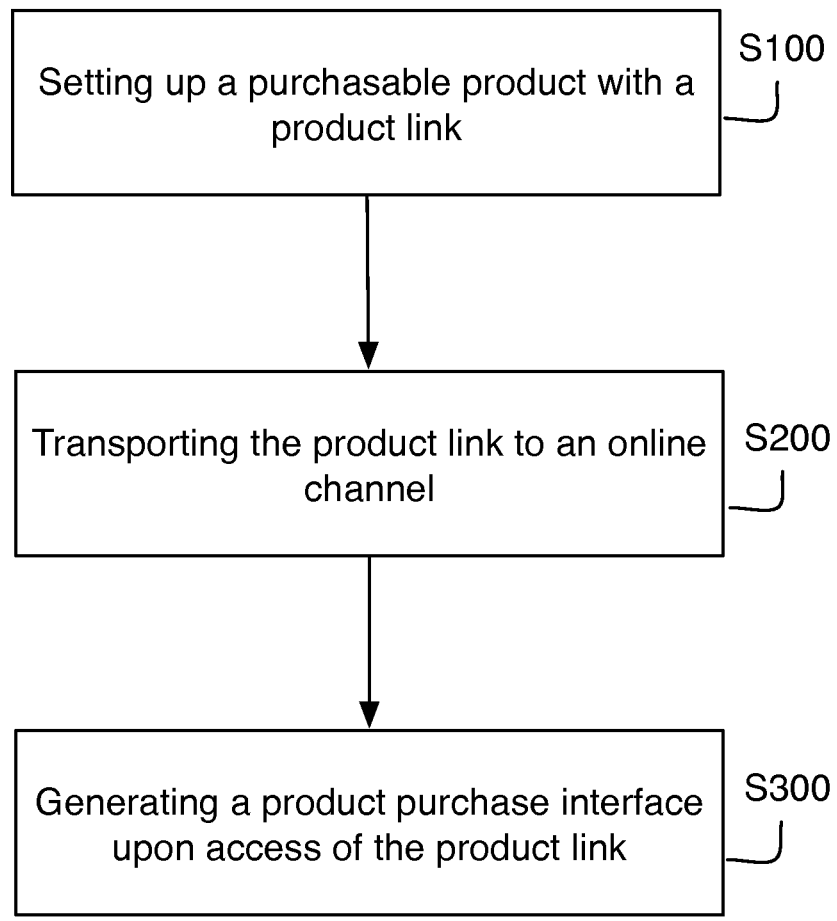
FIG. 6 is a flowchart representation of a method of a preferred embodiment.
Figure 7:
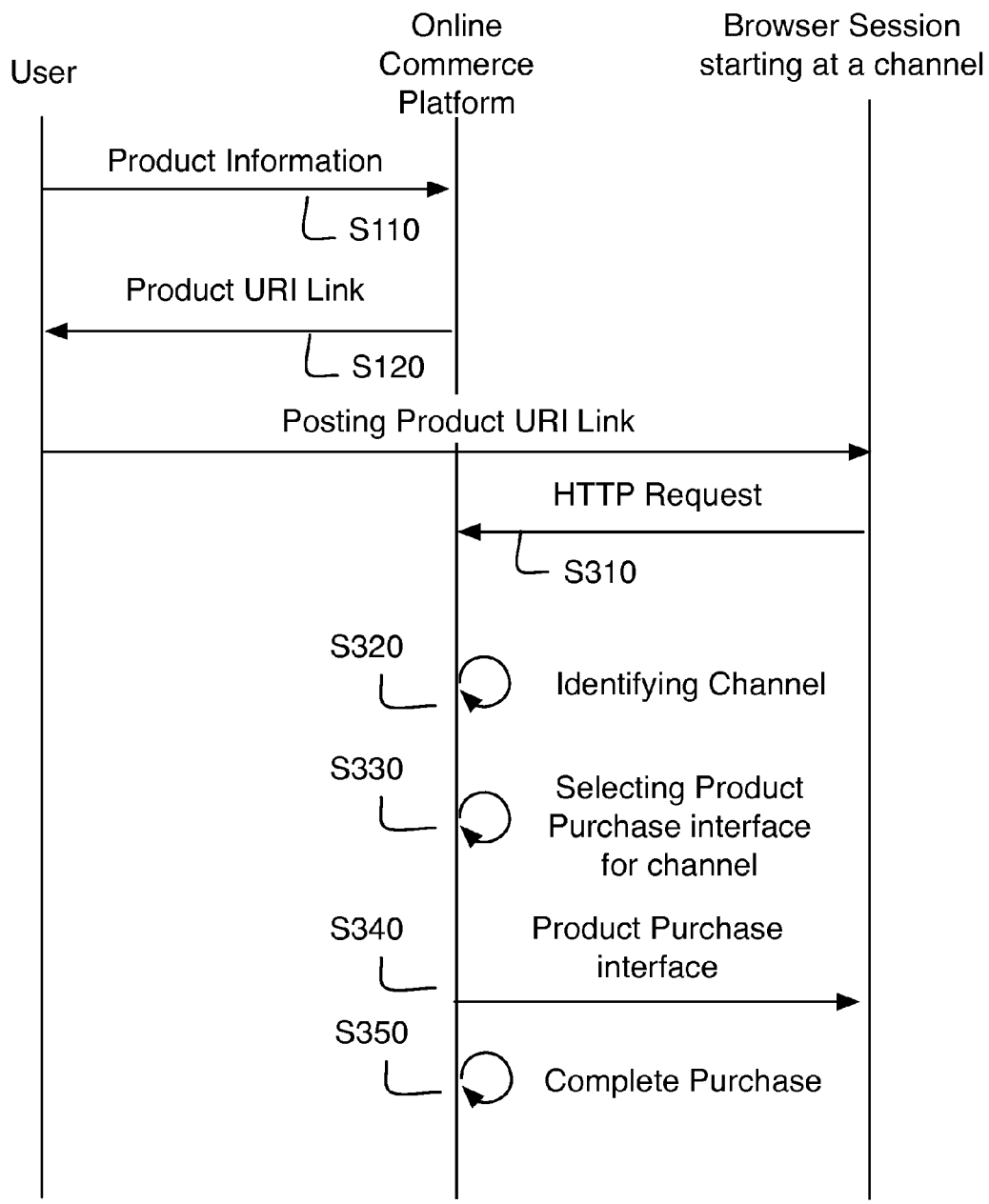
FIG. 7 is a flowchart representation of a method of a preferred embodiment.

As shown in FIG. 6, a method for selling a product through an adaptable purchase interface of a preferred embodiment can include setting up a purchasable product with a product link S100, transporting the product link to an online channel S200, and generating a product purchase interface upon access of the product link S300. The method functions to enable simplified user purchasing experience across multiple web domains. The product purchase link is used in the marketing and sharing of the product, which in some sense can achieve a distributed marketplace through creating adaptive purchase interfaces for a plurality of different channels. When accessing the product through the product link, the product purchase interface is preferably selected based on how the product is accessed. For example, if a product link is accessed from two different channels, the product purchase interface may be configured with functionality and styling that specifically/individually targets each of the two different channels. The method allows merchants to leverage the popularity of a select number of social network platforms and other popular online channels. More specifically, the method of the preferred embodiment includes configuring a product profile for selling S110, providing a product URI link that is unique to the product profile S120, receiving an HTTP request to the link S310, identifying a referral channel of the HTTP request S320, conditionally selecting a product purchase interface mode based on the referral channel S330, transmitting a response of the selected product purchase mode in a reply to the HTTP request S340, and completing a purchase from the product purchase interface S350 as shown in FIG. 7. The method may additionally or alternatively include other various blocks or processes.

Setting up a purchasable product with a product link S100 of the preferred embodiment functions to prepare a product for selling within an online commerce platform. Block S100 preferably involves a merchant setting up a product, internally assigning a unique code or token to the product, which is preferably integrated into a product link, and then optionally sharing the product link. More specifically, block S100 can include configuring a product profile for selling S110, providing a product URI link that is unique to the product profile S120, providing a sharing interface with sharing options from a set of online channels S130, and transmitting at least the product URI link in a publication request to at least one of the online channels S132.

Block S110, which includes configuring a product profile for selling, functions to setup, create, or edit a product for purchase by customers. The product profile is preferably configured through user interaction by a user that is acting as the merchant, seller, provider, author, or otherwise as the distributing entity within the context of the transaction. Herein, the selling user will be referred to as the merchant. The user that acts as the buyer or purchaser will herein be referred to as the buyer. The online commerce platform is preferably a multi-tenant platform that enables multiple user accounts—merchants and buyers can preferably have an account from which they may purchase and/or buy items. In configuring a product profile, a merchant will preferably select an option to add a new product, enter product-identifying information, and save the product profile. The product identifying information preferably includes a product title, product description, parameters of the product (e.g., weight, height, size, color, and the like), uploaded or set media for the product (e.g., product images, video, audio, etc.), price settings (e.g., unit price, price per quantity, price for product options), if applicable set inventory count, a merchant identifier (e.g., sku number), setup product options (e.g., sizes, colors, add-on options, etc.), and/or any suitable product identifying information. The product identifying information may additionally include product rating, product manufacturer, shipping options, and/or any other suitable piece of information or setting that is relevant to the product or to the purchase of the product. The product information can preferably be edited after creating the product. Also, other users may generate product information after creating the profile such as the product rating and comments/reviews. The product can be a physical product, digital product, and/or a service. A digital product can include a music file, a video, an e-book, an application, a generated cryptographic token, or any suitable type of digital file or files. Additionally, the merchant may set merchant identifying information for a product and/or the account. The merchant identifying information is preferably a full name of the merchant and can additionally include merchant logo, contact information, or other suitable merchant information.

Additionally, configuring a product profile may include setting the product purchase interface options. The merchant may set different options for the various online channels such as how the product is displayed within a social media content stream or different features that should be enabled. The merchant may additionally be able to set options in the product purchase interface template, subsequent interface views such as an order confirmation page. As shown in FIG. 8, the user interface may also enable the merchant to direct a buyer to a "thank you"/receipt page after the buyer has purchased the product. The merchant will preferably configure a product profile on a user interface of a page or an application of the online commerce platform. For example, the merchant can input the identifying information into a form on a webpage user interface on the commerce platform website or application. Saving or confirming a product preferably submits the form to a server of the commerce platform, where the product profile will be saved in a database record system. The product profiles of multiple accounts are preferably stored within the database record system. A merchant can preferably access existing and past product profiles by querying the database records for the accounts product profiles. In a preferred implementation, the online commerce platform does not include a browsable marketplace for customers, but in some variations, product profiles may be public and users may be able to browse public product profiles from multiple merchants within a marketplace interface of the online commerce platform.

Block S120, which includes providing a product URI link that is unique to the product profile, functions to provide a sharable reference to a product purchase page that acts as a mechanism for an adaptive purchase experience. The product URI link (also referred to as a URI link) is preferably generated, created, or assigned to the product profile in response to or upon creating the product profile. The URI link is preferably persistently assigned to the product profile, but an option to change or customize the URI link may additionally be enabled as an option to users of the online commerce platform. A single URI link is preferably associated with the product profile but multiple URI links may alternatively be associated with the product profile. The URI link is preferably displayed, sent, or otherwise communicated to the merchant. In one example, after submitting information for a new product profile, a sharing interface may be displayed that offers several sharing options as well as displaying the URI link. The sharing options, described more below, preferably generate posts that include the URI link on various social network channels. The link is preferably communicated as a text string. The link may alternatively be a bar code, a QR code, or any suitable machine or human readable encoding of the link. The URI link is preferably a link to a page of the online commerce platform. The URI link may be one of a main domain name, a sub-domain, or a secondary-domain such as a shortened name of the main domain. In one variation, a merchant may configure a customized domain name to be used. In one variation, the DNS settings may be set by the merchant to point to the online commerce platform. In another variation, the merchant configures the outside domain to conform to a protocol in routing network communication to the domain so that the link may be used to adaptively provide a purchase experience. The link preferably also includes a unique identifier in at least a portion of the link (e.g., in the path portion of the URI). The unique identifier is preferably a token or a string. The unique identifier may be random, created based on product identifying information, or assigned in any suitable manner. The unique identifier is preferably uniquely associated with the product profile. In alternative implementations, the unique identifier may be used as the shared mechanism through which adaptive purchase experiences may occur. The URI link is one preferred mechanism for embedding store activation within the product environment of various website channels. URIs can be easily shared in various websites and applications, and product purchase interfaces can be adaptively generated or used to target websites and other online channels where the URI link is commonly shared.

Figure 9:
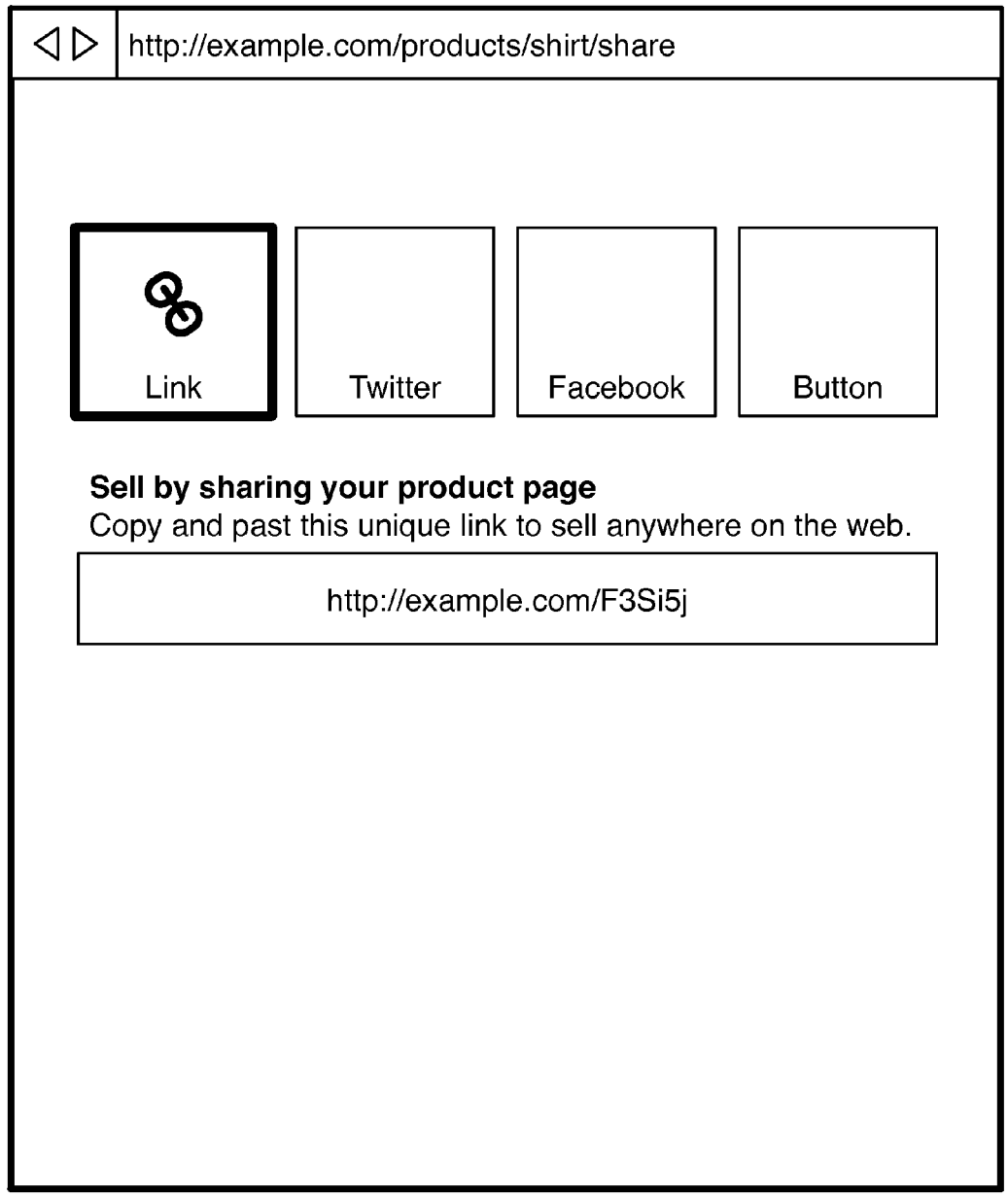
FIG. 9 is an exemplary screenshot of a sharing interface of a preferred embodiment.

The method of the preferred embodiment may additionally include providing the sharing interface with sharing options of a set of online channels S130 and transmitting at least the product URI link in a publication request to at least one of the online channels S132. Blocks S130 and S132 function to facilitate sharing directly with online channels. A subset of the vast number of online channels will preferably have improved and/or integrated shopping experiences. The sharing options preferably simplify the sharing of the link with at least a subset of these online channels with improved shopping experience. There are preferably at least two sharable online channels. The online channels are preferably outside/third-party social networks, blogging platforms, media sharing platforms, or other web platforms that have a content sharing element. For example, a message including the link may be shared in Twitter tweets, emails, Facebook messages, Facebook statuses, blog posts, image sharing apps, and/or any other suitable means of communication to an outside channel so that his or her social network can easily access the webpage. The provided sharing interface is preferably displayed after completing configuration of a product profile, but the sharing interface may be displayed or accessed at any suitable time. As shown in FIG. 9, the sharing interface preferably includes online channel sharing options as well as the option of copying the link. A merchant can optionally select one or more sharing options and proceed with publishing a message to the selected online channel. Programmatic logic of the sharing interface will preferably facilitate authentication of an account with the selected online channel or channels and posting a default or customized message to the channel. The post will preferably include the link. Additionally or alternatively, a channel specific reference may be used in place of the link. For example, in one variation, the link may be replaced by a channel specific product link or an application. The manner of sharing the link may be customized to the particular online channel. In one variation, a sharing option will be a media-sharing platform. Sharing to the media platform will preferably facilitate posting video, music, images, documents, or other content to the online channel. Additionally, the media may be augmented with the link. In one example, superimposed video annotations with the product link may be added to a video. The annotations are preferably added as soft annotations (e.g., not encoded into the actual video frames) through an API of the video hosting platform. Additionally, the link may be added to the description of the video. In another example, active links may be embedded into a document uploaded to a document-hosting platform. For example, a pdf preview of a book may be uploaded to a presentation/document hosting platform, and between particular pages or in a footer of a page the product link may be added. The online commerce platform preferably performs the necessary API requests for such media modification and/or pre-processes the media prior to uploading to the outside channel.

Figure 10:
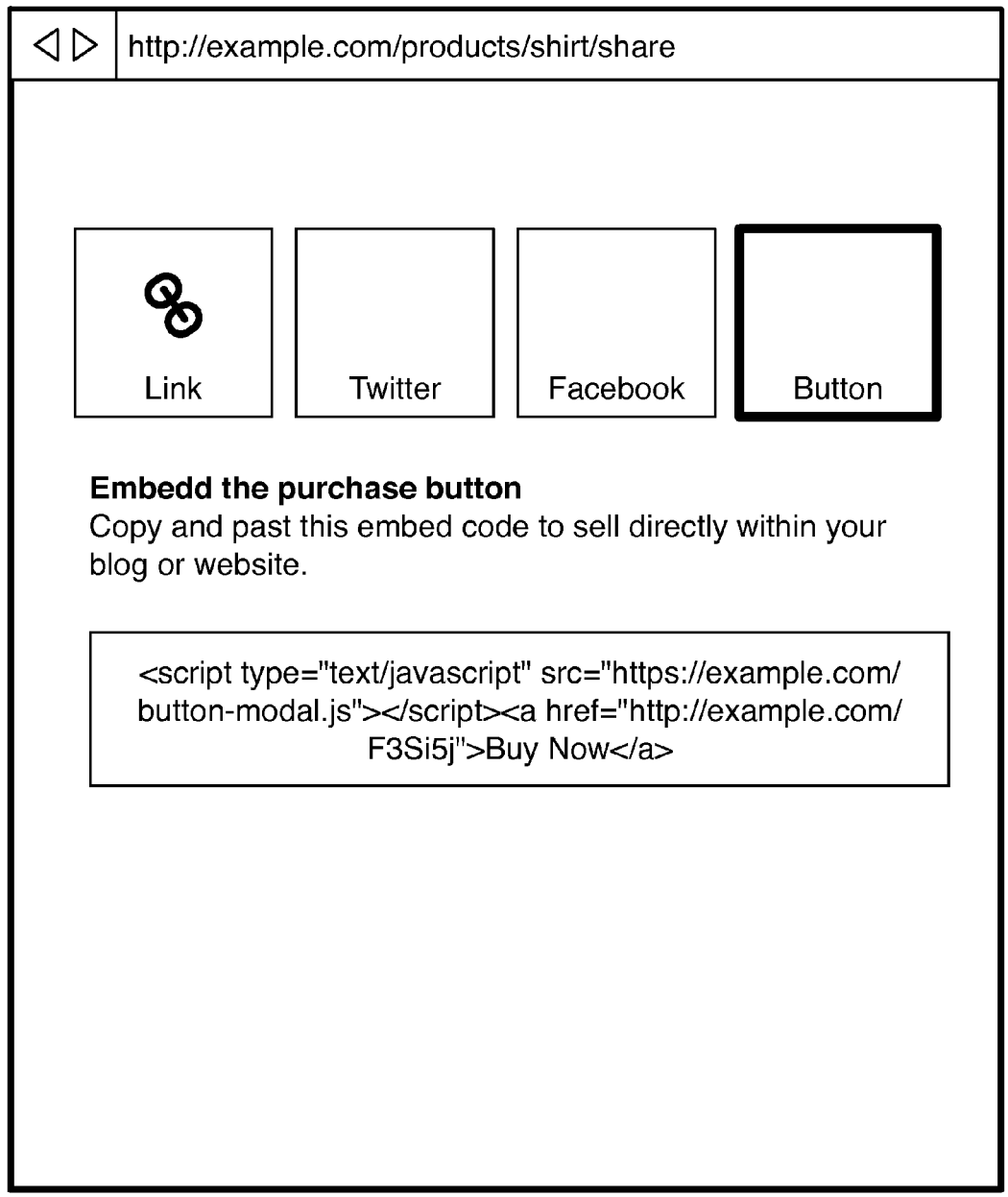
FIG. 10 is an exemplary screenshot of a sharing interface with embeddable content.

In another variation, a sharing option of the provided sharing interface may include embeddable content. The embeddable content is preferably HTML markup as shown in FIG. 10 but may alternatively be a flash file, a Java applet, a script file, or any suitable content that may be used for embedding a purchase. In one preferred implementation, the embeddable content is HTML markup of a script tag referencing a JavaScript file and a link anchor HTML tag with the link. The JavaScript file is preferably configured to style the anchor tag and enable an integrated modal purchase interface on the website. With the embedded content sharing option a user can use the provided code or file to enable purchase interfaces on a variety of online channels. In particular, the embeddable content can be useful for adding purchase interfaces that integrate with blogs or websites where content management allows for posting of HTML content.

Block S200, which includes transporting a product link to an online channel, functions to publish the link within content of an outside channel. As described above, a sharing interface may be used to facilitate the sharing of the link to an outside channel. However, a merchant may additionally freely share the link with others or post the link in an online channel. A preferred benefit of the preferred embodiment is the flexibility and ease of distributing the link. As the link functions as a mechanism that progresses a buyer through the checkout experience (i.e., from browsing to checkout), anywhere the link can be posted is now territory for a distributed marketplace. For example, a merchant will copy the link and share the link on various social media sites, blogs, printing the link or a machine-readable encoding of the link on physical marketing material, send the link in a message (e.g., email, text message, push notification, etc.), and/or distribute the link in any suitable manner. Furthermore, as the purchase interface is tied to activation of a link, the purchase interface can be virally shared across the internet by outside users in place of or in addition to the merchant.

Figure 11:
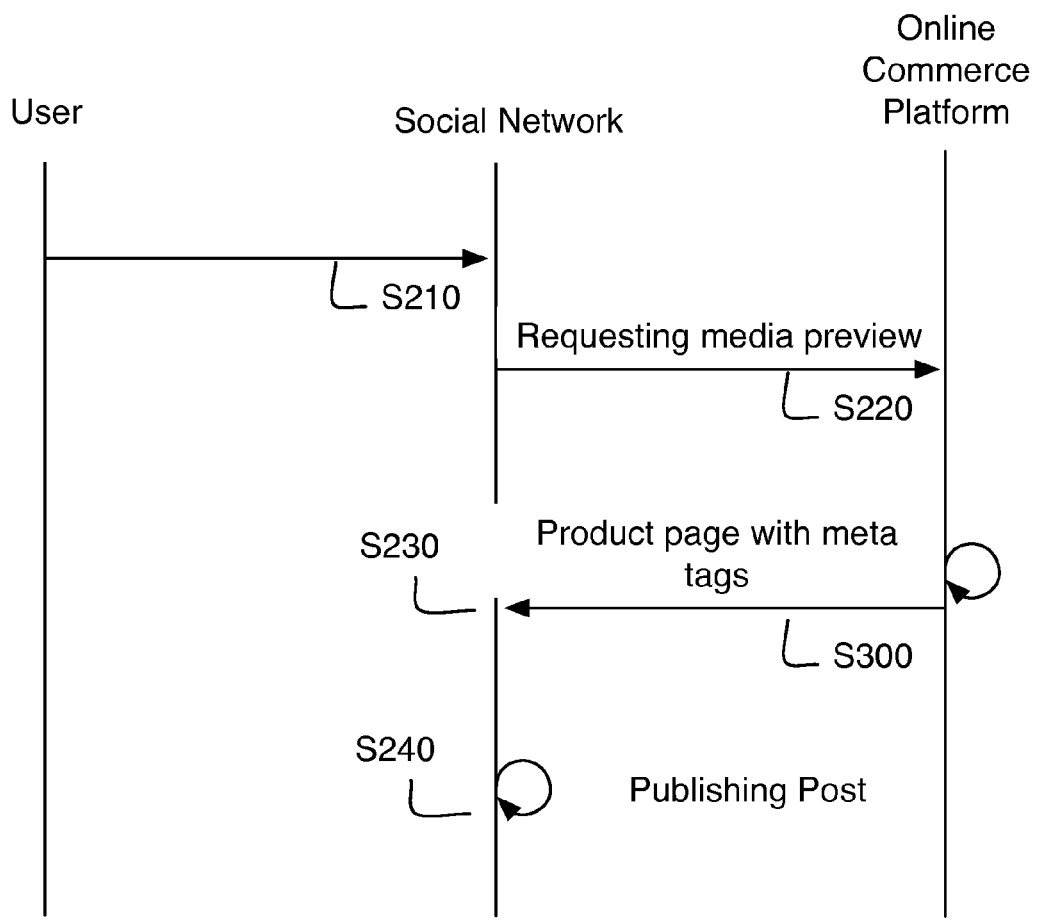
FIG. 11 is a flowchart representation of a variation of a method of the preferred embodiment for channel preview purchase interface.

In a preferred scenario, the link is shared on a social media online channel (e.g., Facebook, Twitter, LinkedIn, etc.). A social media site is preferably agnostic to the context of the link, and functions in a substantially normal manner. As described below in an alternative embodiment, a social media site may additionally actively facilitate the generation of an adaptive purchase interface within a channel. As shown in FIG. 11, a process of a social media channel may include, at the online platform with a media stream, receiving a post request with the link S210; requesting media from the link S220; receiving an embeddable product purchase interface S230; and publishing the post S240. The post request is preferably made through a post interface on a website or application of the social media channel. An outside application or service may alternatively submit the post request through an API or other suitable interface. The post will preferably include the link. The link is preferably accompanied with some text that provides context for the nature of the link. Many social media channels generate previews or summaries of a link in a post. While a user is drafting a post or after receiving the post request, the social media channel will query the link. Various conventions may be used amongst websites for specifying how link summaries should be used. One preferred implementation is through web pages specifying open graph meta tags that describe the content. In a preferred implementation, an open graph meta tag may specify the product information and a product purchase interface. In this variation, the social media channel actively inspects for product and marketplace functionality. In another preferred implementation, the open graph meta tags for media may be utilized to transparently embed the product purchase interface. For example, an open meta tag for a video and video type may specify a URI for a flash based embeddable purchase interface and a video type of a flash application. In this variation, a social media channel can be used to display in-stream product purchase interfaces through the direction of the online commerce platform (i.e., the social media site may not provide any functionality directed to in stream purchases). Other alternative approaches may selectively target the preview content used by the specific channel. The social media channel will preferably retrieve the media preview as interpreted from the link preview query. In publishing the post, the link preview will preferably be displayed seamlessly in the content stream as shown in FIG. 4, wherein users can purchase items without leaving the social media content stream.

Generating a product purchase interface upon access of the product link Block S300 functions to customize access of the URI link according to the manner in which the link is accessed. Preferably the product purchase interface is selectively customized according to the referring channel. The product purchase interface may additionally or alternatively be customized based on the accessing device, the geographic location of access or any suitable variable of how the link is accessed. Block S300 preferably includes receiving an HTTP request to the link S310, identifying a referral channel of the HTTP request S320, conditionally selecting a product purchase interface mode based on the referral channel S330, and transmitting a response of the selected product purchase mode in a reply to the HTTP request S340.

Block S310, which includes receiving an HTTP request to the link, functions to obtain an attempt to access the resource specified by the link. The online commerce platform preferably uses the unique identifier of the link to identify a product profile associated with the HTTP request. In directly mapping the link (and the unique identifier) with an individual product, access of the link can be interpreted as intent to purchase the associated product. The HTTP request is preferably sent in response to a user clicking or activating a link within an outside channel. One aspect of the preferred embodiment is to adapt the shopping experience so that it conforms to the experience of the channel from which the user accessed the link. The link may alternatively have been directly entered (e.g., no referring channel).

Block S320, identifying a referral channel of the HTTP request, functions to determine how a user was directed to the link. Identifying the referral channel preferably includes inspecting the referrer/referer header field of the HTTP request. An online channel may include numerous domains and sub-domains from which the link may be accessed. The online commerce platform preferably maintains a database of referrer domains for particular online channels. When any of those referring domains are detected, the associated channel is identified as the referral channel. Additionally, other parameters of the HTTP request may be inspected and used in conditionally selecting a product purchase interface mode in Block S330. For example, the user agent may additionally be inspected to identify the device and/or application used to access the link.

Block S330, which includes conditionally selecting a product purchase interface mode based on the referral channel, functions to at least partially determine the type of product purchase interface. The product purchase interface mode is preferably selected from a set of interface modes. The set of interface modes preferably include a mode for popular online channels with specialized product purchase interfaces and at least a default product purchase interface. For example, two popular social media channels (e.g., Facebook and Twitter) may have specialized product purchase interfaces. A default site may be used for links accessed from other channels. The identified referral channel is preferably used to determine the product purchase interface mode. The device, accessing account, and/or any suitable parameter of the HTTP request may additionally be used to conditionally select the mode. In one example, the modes may include: if the referral channel is a first social media channel, the selected interface mode triggers a redirection to an application within the first social media network is selected; if the referral channel is a second social media channel, an interface mode triggers the applying a customized template to the page of the online commerce platform; if the referral channel is one of the first or second social media channels and the request is identified as a media preview query of the social media channel, replying with a document specifying meta tags that indicate an embeddable purchase interface configured for display within the content stream of the third social media channel; and if the referral channel does not have a specified mode, replying with a default page of the online commerce platform.

In one exemplary implementation, the first social media channel is Facebook and the second social media channel is Twitter. In this exemplary implementation, clicking a link on Facebook would direct the user to a product purchase interface within a Facebook application, clicking a link in a tweet on Twitter would direct the user to a product purchase interface on a page with similar formatting as the Twitter site, when viewing a Facebook newsfeed item or a tweet on Twitter, a flash-based product purchase interface will be rendered in the link preview or tweet card respectively, and if the link is accessed from a blog or an email a default product purchase interface on a page of the online commerce platform is accessed.

In a preferred embodiment, the product purchase interface is a checkout page configured for the direct purchase of the product associated with the URI link. In the preferred embodiment, there may be no concept of a shopping cart—by accessing the link the user signals to the online commerce platform intent to purchase the product. The user is taken to an interface to provide billing information (if not stored), shipping information (if required), and approve the purchase. In one variation, a shopping cart metaphor may be incorporated into the operational model of the online commerce platform. For example, clicking the link may indicate intent to add the product to the cart. By clicking on multiple links (from within one channel or multiple channels), the user may add more items to a cart.

Block S340, which includes transmitting a response of the selected product purchase mode in a reply to the HTTP request, functions to generate, access, or redirect the HTTP request with an adaptive product purchase interface.

Figure 12:
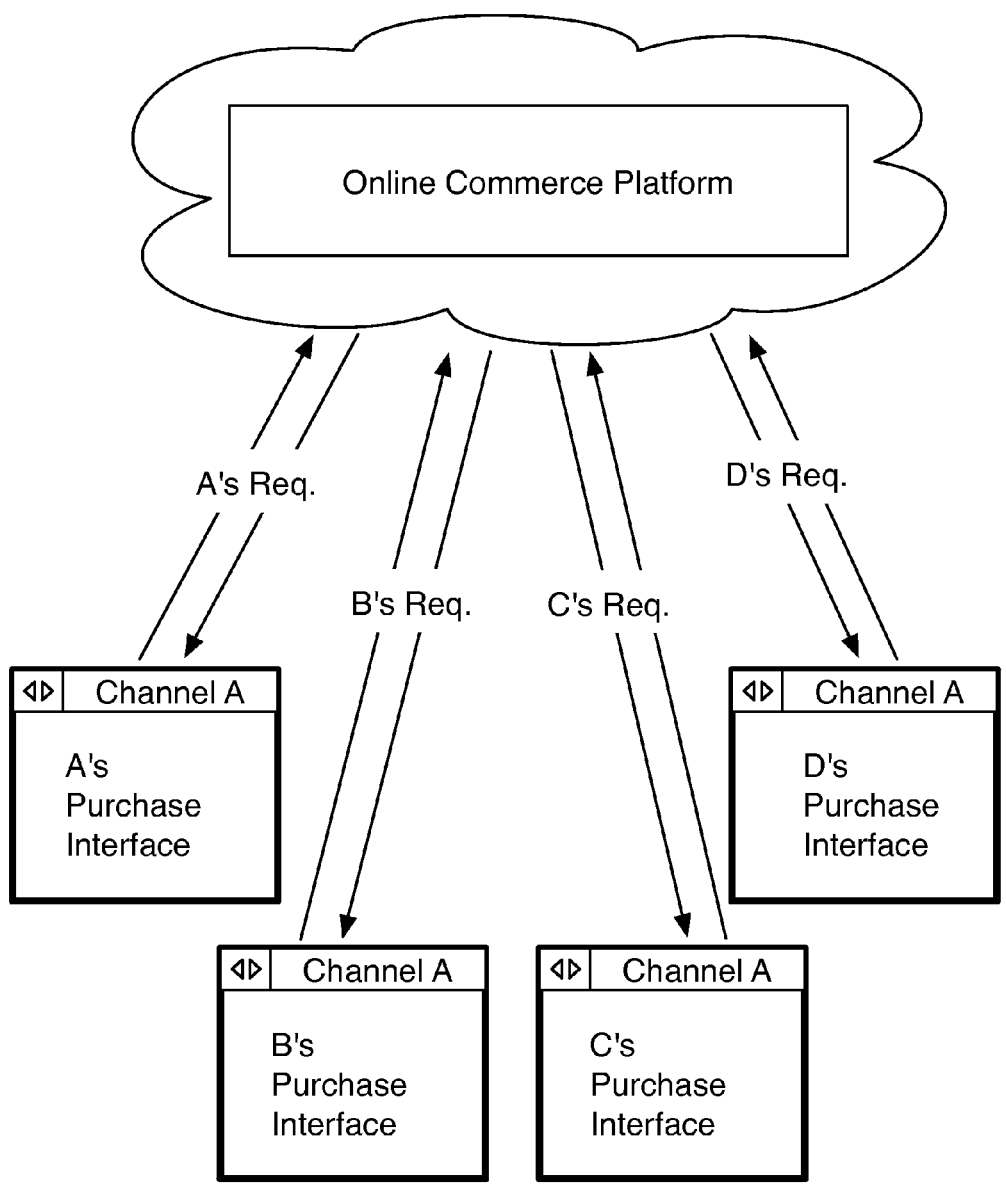
FIG. 12 is a schematic representation of a plurality of selective product purchase interfaces.

Block S340 further functions to dynamically load the appropriate content for an access attempt of the URI. The product purchase interfaces are preferably substantially consistent across the different modes, but they may be implemented or rendered with various features that customize the purchase experience according to how the link was accessed as shown in FIG. 12. The response is preferably a HTTP response. The HTTP response can include a HTML document or an interactive application (e.g., java applet, flash file, etc.). The HTTP response may alternatively redirect the request to another domain. As shown in FIG. 3, the product purchase interface preferably displays any relevant information concerning the product itself (photo, description, price), as well as fields for consummating the purchase of the product including a buyer name, buyer email address, buyer shipping/billing addresses, and the like. The product purchase interface displayed can additionally include a button or link to complete or finalize the transaction. Preferably, the product purchase interface contains all pertinent and necessary information to inform the buyer about the product, collect the relevant financial and shipping information, and execute the terms of the purchase. The product purchase interface preferably functions to eliminate the multitude of web pages, scrolling, tabbing, windowing, and other inefficiencies associated with typical electronic commerce by presenting the entire terms of the transaction on a single unified interface for both the merchant and the buyer.

As was introduced above, one mode variation can direct a user to an account page on the referral channel, which can be referred to as channel app mode.

Another mode variation can respond with a hosted page, which can be referred to as a hosted page mode. The hosted page mode is often used as a default for when there is no referring channel or the referring channel does not have a specified mode. In a related mode variation, the hosted page may be customized, which can be referred to as a customized hosted page.

In another mode variation, the HTTP access is not for a user request to access a page, and is instead a request from an online channel platform, often querying the link for post preview media. In this mode variation, the response can specify embeddable purchase interface. This variation is often used to include a purchase interface in the stream of a social media, and so this mode of variation may be referred to as a stream embedding mode.

Another mode variation may employ the use of a browser plugin or widget that actively attaches special event handling to URI links detected to be of the online commerce platform. When such a link is activated on a channel, the handling of the link event is preferably delegated to the plugin. The plugin will preferably dynamically generate a model product purchase interface within the page. The model will preferably display the checkout interface components within an iframe, while the modal element is overplayed on the current page. Other product purchase interface modes may additionally or alternatively be invoked.

Figure 13:
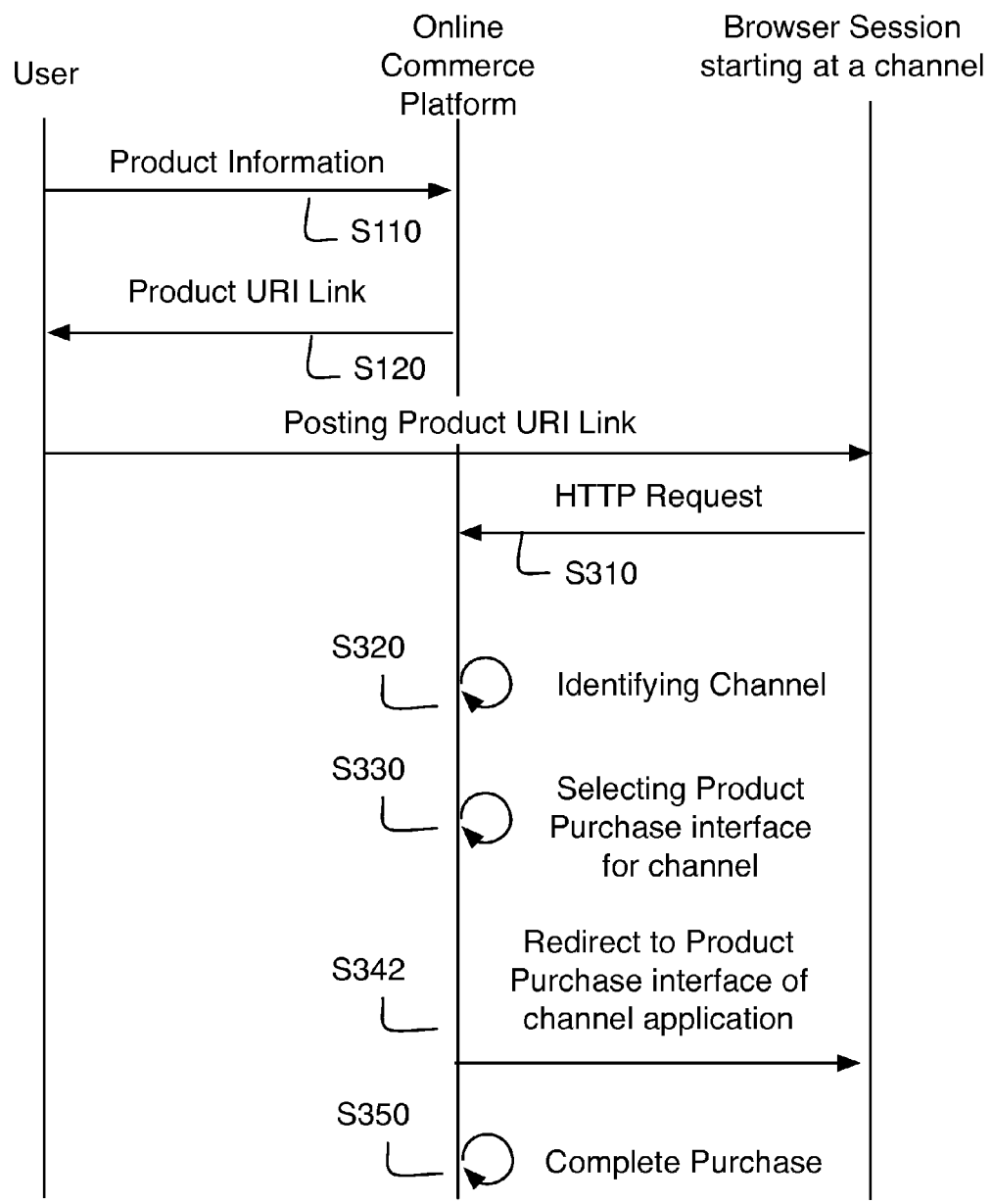
FIG. 13 is a flowchart representation of a channel app mode variation.

In the channel app mode variation, transmitting a response of the selected product purchase mode may additionally include redirecting to a product purchase interface implemented within an account on the referring channel S342 as shown in FIG. 13. This product purchase interface mode is preferably selected when the merchant has established an account page, application, or other operative component that is accessible from within the referring channel. Accordingly, the operating entity of the online purchase platform may provide an application or account page within an online channel. For example, the company or developer of the online commerce platform may develop a Facebook application in which the product purchase interface can be rendered. The Facebook application is preferably invoked when the link is clicked with Facebook such that the user is kept inside the Facebook ecosystem and the purchase experience is less disruptive to the browsing experience. Facebook specific actions may be enabled in keeping with the customization of the product purchase interface for Facebook. Such a platform application can be similarly implemented for other online platforms. In another example, the company or developer may create an account page in the online channel, and then create a page or pages within the online channel where the product purchase interface can be rendered. For example, an account may be created on a blogging platform, and a page or pages may be manually or programmatically created with HTML content to render a product purchase interface. In the platform application and in the account page variations, the product purchase interface is preferably implemented within a browser frame (e.g., within an iframe). The browser frame is preferably directed to a page of the online commerce platform. The page is preferably secured through an SSL security certificate or any suitable security measure. The use of a browser frame unifies development of the checkout process and can enable security to be maintained independently of the security of the parent frame (i.e., the containing online channel). The account page is preferably within the same platform of the referring channel, but the account page may alternatively be in a related channel or similar channel. For example, accessing a link in YouTube may direct a user to a Google+ application page or an account page because of the shared operating entity of Google. The account page or application is preferably accessed by redirecting the HTTP request of the link. In one variation, the response is an HTTP response specifying a refresh header status code (e.g., status code 301 or 307), and a location header with a URI of the account page or application. In another variation, the link page may be configured to perform a JavaScript redirection when loading the page, such that accessing the page will load the link URI, which may be a visually blank page, and then JavaScript will set window.location to the URI of the account page or application.

In a variation of the channel app mode or in addition to the channel app mode, redirecting to a product purchase interface may include redirecting to an application. Above, the redirection was preferably to another website URI, but the redirection may alternatively be to an application. Applications can be redirected to by specifying an application protocol in the location redirection. For example, the when the original URI was "http://example.com/F3Si5j", the redirected URI may be "foobar://example.com/F3Si5j". The device preferably recognizes the application protocol component in the URI and directs the resource indicator to an application responsible for handling the protocol (e.g., the application responsible for the "foobar" protocol). The application redirection may alternatively use any suitable mechanism that opens applications and directs them to process a particular request.

The application redirection preferably functions to facilitate purchasing products on mobile computing devices. Phones, tablets, wearable computing devices, and other mobile computing devices can use applications as well as online websites as the main medium of the online channels. The application redirection mode may be based on the HTTP header fields or other parameters that indicate the device, the accessing application, the browser device (which may be specific to a particular type of device), or any suitable information to conditionally determine if the application mode should be selected. The application redirection mode may additionally be applied to desktop computing devices or any suitable computing device.

The application where a user is directed may be the same application in which the user accessed the link. For example, a user clicking a link in a Facebook application may initially try to load the HTTP product link, and then be re-directed to an interface on the Facebook app where the product purchase interface can be seen. The redirection may be transparent to the user. The application may alternatively be an application dedicated to an outside application such as a dedicated application for completing transactions. For example, a user may click a product link in one application or browser, and in response to the application redirection, the appropriate application opens and loads with a product purchase interface customized to the accessed product link (e.g., a checkout page for the associated product). The operators of the online commerce platform preferably operate the dedicated application, but any suitable entity may alternatively operate the application.

In the hosted page mode variation, transmitting a response of the selected product purchase mode may additionally include responding with a product purchase interface on a page of the online commerce platform, which functions to load a webpage for the product. The response to the HTTP request is preferably a page hosted on a page of the online commerce platform. In other words, when a visitor clicks a link and the hosted page mode is selected, the user will be directed to a URI of the online commerce platform. The URI is preferably the same as the link. The hosted page mode variation is preferably the default option when loading the product link. The hosted page mode is preferably used for unknown referral channels, when the user manually enters the link URI in a navigation bar of a browser, or for referral channels that have no pre-specified handling. The hosted page mode may additionally customize the product purchase interface depending on the referring channel. Responding with a product purchase interface may include rendering the product purchase interface with a template according to the referring channel. The template preferably specifies visual elements that match the aesthetic and/or user interface of a particular channel. In another variation, the template may customize the product purchase interface for different devices such as desktop computers, mobile computers, phones, TV's, and/or any suitable device. Additionally, the template may determine functionality of the product purchase interface. For example, particular actions of the referring channel may be emphasized or included. For example, after completing a purchase, the interface may provide an interface mechanism to share the purchase back on the referring channel. Upon canceling a purchase or completing a purchase the user may be automatically redirected to the location in the referral channel (e.g., the referring URI), when the user clicked the link.

In the stream embedding mode variation, a page of the online commerce platform can include including meta data tags that specify an embeddable purchase interface; and providing the embeddable purchase interface upon receiving an HTTP request of the referral channel. The stream embedding mode variation, functions to use a HTTP request made by a channel to access preview media content to embed a product purchase interface. When a user is making a post on another site, after a post is published, or as a post is published, social media sites often perform a media preview query for a URI included in the post. That media preview query can be leveraged to embed a product purchase interface into the media preview. An embeddable purchase interface is preferably supplied as the media for the media preview. Correspondingly, the product purchase interface will be displayed within the interface of the social media site. Often, the media previews are displayed within a content stream (e.g., a stream of posts by the user and social network connections of the user). The embeddable purchase interface is preferably configured for seamless display within of the content stream in the referral channel. The size and stylistic formatting preferably conform to the practices of the channel. A different type of embeddable purchase interface may be used for each channel in which an embeddable purchase interface can be used. After a link is included in a post on a social network, two types of product purchase interfaces can be invoked from the post. In one case, the user may click the anchor tag link to the URI link. In this case, an HTTP request to the link (Block S310) may be performed and a channel app mode or a hosted page mode may be used depending on the channel. In a second case, the user may activate and use the embeddable purchase interface.

The media preview is preferably generated in response to at least one meta tag in a header of an HTML document response. A meta tag is preferably metadata in the form of an HTML tag element but may be any suitable tag, field, element, header, or other suitable component that is used to specify a parameter or variable. An HTTP document may include a variety of different meta tags. At least one of them is used to facilitate embedding a purchase interface. The meta tag is preferably an open graph meta tag specifying a URI of the embeddable purchase interface as shown in FIG. 14. Open graph is one preferred social graph protocol, but any suitable social graph or other informational protocol may be used. A social graph is preferably a protocol that can be used to define the relationships, objects, and actions. Open graph in particular can be considered a structured, strongly typed API. The embeddable purchase interface is preferably a flash media file configured for implementing an interactive purchase interface, but may alternatively be HTML/JS markup, a Java applet, or any suitable executable media file. In one variation, the channel may not have an option for specifying an embeddable purchase interface in the meta tags. In this case, meta tags that target media previews of a video may be used. Online video playback is often implemented with flash or other executable media. The embeddable purchase interface preferably impersonates a flash video player so as to be included in a media preview. When the media preview is interpreted as a video, the media preview in some scenarios may display a thumbnail of the media preview until the media preview is activated (e.g., clicked, tapped, selected, etc.). Once activated, the product purchase interface can be displayed in the embeddable purchase interface displayed as media on the channel. The embeddable purchase interface preferably implements SSL certificate based security for securing the payment information obtained through the interface. In alternative embodiments, a channel may access application meta tags, web-content meta tags, or more specifically a purchase related meta tag that would enable the embeddable purchase interface to be rendered as embedded content in the channel without posing as video. In such a case, the embeddable purchase interface may be implemented as HTML content displayed in a secured iframe.

In one variation the link is included in a channel as embeddable content, preferably with including a script tag and the link contained within an HTML anchor tag. In this variation, the script tag will import a script of the online commerce platform that contains operational instructions to render an embedded product purchase interface within the containing page. Preferably the embedded product purchase interface is rendered within a browser frame of a modal window. Additionally, upon loading the page, the script may dynamically augment the anchor tag to add styling and optionally connect the browser event to display the product purchase interface. As described above, the embedded content is preferably provided as HTML code that can be copied or directly published in the sharing interface described above.

Block S350, which includes completing a purchase from the product purchase interface, functions to perform the final checkout steps within the product purchase interface. Completing the purchase preferably includes receiving billing and delivery information for the buyer. Form fields are preferably displayed within the product purchase interface to collect and/or edit billing information and a shipping address (if shipping is required). Additionally, product options may be set for the product. Product options may include option selection, text input, media upload form elements, and/or any suitable input to modify the product. For example, the size of a t-shirt may be selected within the product purchase interface. If the buyer is purchasing a product that is to be delivered through regular mail, the delivery information preferably comprises at least an address. Alternatively, if the user is purchasing a product that can be delivered online (e.g., an access code to an electronic gift card), the delivery information may comprise an email address, a social networking account, a cell phone number, or any other piece of information identifying the product to be delivered to the buyer. The buyer is preferably prompted with a question that asks him how he or she would like to pay. Also, the user is preferably prompted with the option to select from a variety of shipping means, if necessary. Other inputs may additionally be collected, such as a coupon code. The cost of a product may be dynamically calculated based on product options, shipping information, and/or location of the buyer (e.g., for regional taxes). The grand total can be displayed at the base of the single webpage. The product purchase interface is preferably substantially similar for the various modes described above.

In some cases, a channel may be used to augment the interface. For example, when the product purchase interface is accessed on an account page of a social network channel, the account name and/or address information of the user accessing the interface may automatically populate the shipping form fields. The purchased product can be for a variety of items including a physical product, a digital product, a subscription to a physical and/or digital product, a service, a donation, an event, credit, a token, gift card, or any item. The products are preferably sold at a particular price, but the products may alternatively be free or obtained in exchange for a virtual currency. A physical product will be sent via snail mail or through other delivery means, and may require a shipping address or alternatively use a stored shipping address. A digital product may be a downloadable file that can have a download expiration date, a limit on the number of downloads, and/or other associated download limits/rules. Another variation of the preferred method can include receiving a merchant selection regarding whether the merchant would like to manage the download on a separate platform or through the first computer.

Figure 15:
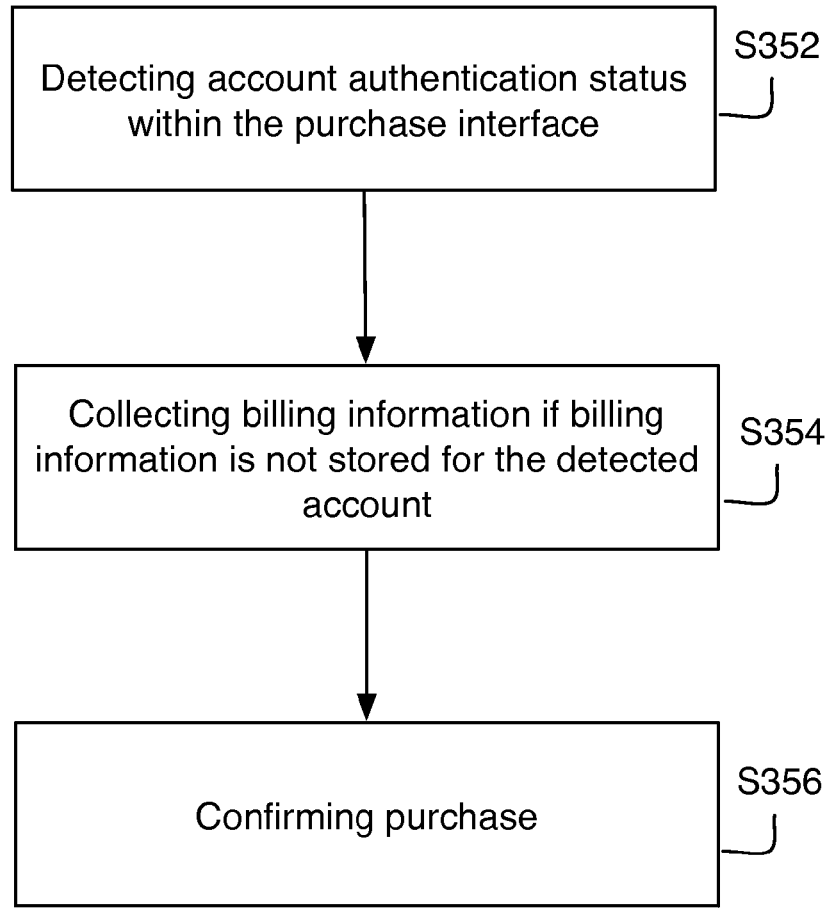
FIG. 15 is a flowchart representation of additional sub-blocks of completing a purchase from the product purchase interface.

Block S350 may additionally include detecting account authentication status within the purchase interface S352; collecting billing information if billing information is not stored for the detected account S354; and confirming purchase S356 as shown in FIG. 15. The online commerce platform preferably works on an account system. One benefit is that the account system can be used so that the checkout process for returning customers can be simplified. For example, billing and shipping information may be automatically completed when loading the product purchase interface. In many mode variations, the product purchase interface is rendered through a page of the online commerce platform (either on a domain of the platform or within a browser frame of another channel). As such, browser cookies can be used to maintain authentication state for pages on the domain of the online commerce platform. Detecting account authentication status may include detecting cookies of the purchase interface. In an exemplary scenario, a user first purchases a product on a page of the online commerce platform, and subsequently the user visits a channel that has an embedded purchase interface. When encountering the embedded purchase interface, the payment information of the user may be automatically completed based on the first purchase. Despite the user being on two different domains (the second one possibly even unaware of the inclusion of a product purchase interface), the user can experience an improved and consistent checkout experience.

In another variation, an account may be detected through accessing an account identifier of the referring channel. Often the referring channel will be a social media channel in which the user will be authenticated. The username, account id, an authentication token, or some other identifier in the referring channel may be shared with the online commerce platform. When an embedded purchase interface is implemented in a browser frame (e.g., an iframe), then cross domain communication techniques may be used such as using postMessage, by passing the identifiers through URI parameters of the iframe, using on-demand JavaScript, or any suitable technique. Similarly, if the embedded purchase interface is implemented as a flash file, the flash file may use an external interface function call to collect user identifiers.

Additionally, channel account identifiers may be obtained by a user adding the channel account to the platform account. In one example, a user may create the account on the platform using a specific channel account (e.g., signing in using Facebook, Twitter, Google, or other platform authentication). In another example, the user may voluntarily connect a platform account with an outside channel account. In yet another example, a user with a platform account may authenticate with an outside platform to enable sharing and other interactive features with the outside channel. Channel accounts can additionally be associated with accounts or identities of the online commerce platform, essentially merging online identities used to make purchases. Unifying purchase identities of users can enable the online commerce interface to enable simplified checkout experiences to users. The online commerce platform preferably maps the account identifier of online channels to accounts of the online commerce platform (i.e., platform accounts). By creating a mapping between platform accounts and various online channels, the online commerce platform can more broadly provide improved checkout experience. Preferably, stored billing information can be automatically used in the product purchase interface across multiple modes of the interface (as a hosted page, a channel application, as an embeddable purchase interface media file, and the like). When accessing a product purchase interface a user may be presented with an option to login to an account, which may enable stored information to automatically complete billing and/or shipping address information.

Figure 16:
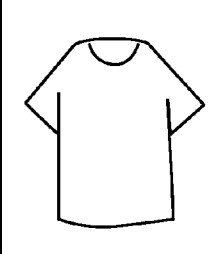
FIG. 16 is an exemplary screenshot of a variation of a product purchase interface with an augmented URI link of a preferred embodiment.

Additionally, a method of a preferred embodiment may further comprise augmenting the URI link with purchase parameters S140 as shown in FIG. 16. The purchase parameters are subsequently used to pass information back to the product purchases interface and/or the online commerce platform when selecting a product purchase interface mode. In one exemplary implementation, referral codes may be appended to the end of the URI link. When the URI link with the referral code is used, the affiliate or entity associated with that referral code is preferably credited for contributing to a portion of the sale. When the product purchase interface is loaded for the referral URI link, the referral code is preferably added to a hidden form field so that when the purchase form is submitted the affiliate account associated with the referral code is credited.

Figure 17:
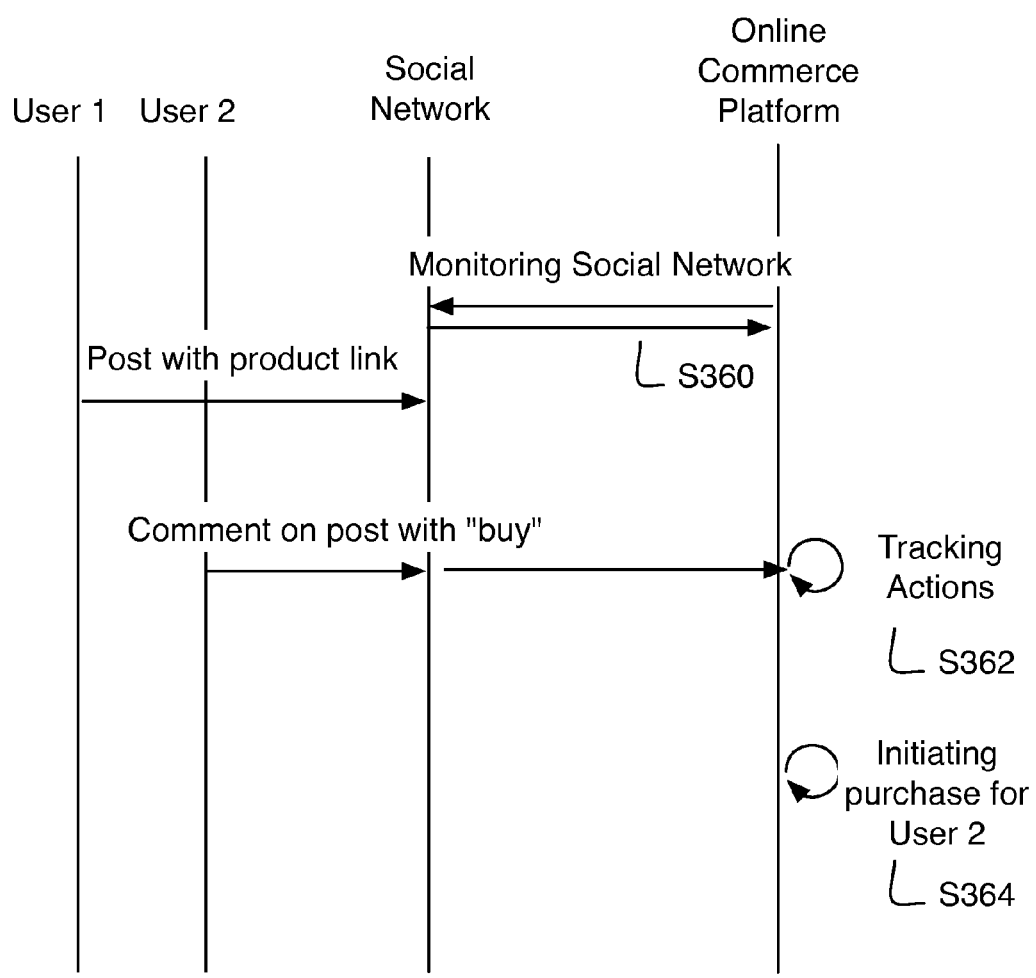
FIG. 17 is a flowchart representation of sub-blocks that enable purchase actions within a channel.

Additionally, a method may additionally include sub-blocks that function to enable purchase actions within a channel. The additional sub-blocks can include detecting a post that includes the link that is made on a referral channel S360; and monitoring actions taken within the referral channel on the post for a purchase action S362; and if a purchase action is executed by an account, initiating a purchase process for the product S364 as shown in FIG. 17. In some sense, the link is used as a marker or signal to the online commerce platform that the channel content should be enabled as a purchase mechanism. Blocks S360, S362, and S364 are preferably performed by an outside/third-party channel. Actions are generally channel specific actions such as commenting, liking, favoriting, rating, forwarding/reposting, responding, quoting, or any suitable channel specific action. A subset of actions may be monitored, and in some variations, the action must conform to a specified syntax or pattern. For example, the monitored action may be reposting the link or writing a new post with the link with the phrase or tag of "buy". Other actions such as liking or favoriting can similarly be used to initiate a purchase for a user. Initiating the purchase process can occur in several different variations. In a first variation, the user account on the channel has previously purchased through the online commerce platform, and thus billing and/or shipping information is stored from the prior purchase. This information may be automatically used to complete the purchase. Additionally, an email or message may be sent to the user that informs the user of a pending purchase and an option to cancel the purchase. The purchase is preferably completed if the user does not respond to the message by a certain time period (e.g., within the hour or within a day). In one exemplary use scenario, a first user will post a product URI link to a social network. A second user, encountering the post, may comment or reply to the post with the phrase "buy". The online commerce platform, while monitoring the social network will identify the action of the second user and initiate a purchase process. If the social network account of the second user is associated with an account on the online commerce platform and the second user has stored billing/shipping information, the purchase transaction can be automatically completed. If the social network account of the second user is not known by the online commerce platform, a message may be sent to the second user through the social network with information on how to register and/or complete the purchase.

In one exemplary implementation scenario, a merchant may register a product through an account interface on a website or application of the online commerce platform. A product link is then shared with the merchant through the interface. The merchant then shares the link in a post on Facebook (or any other social network), possibly using the sharing interface. Facebook may detect that a link was included in the post and attempt to generate a preview of the content. This can involve a server of Facebook querying the product link. The online commerce platform, either by default or by detecting that Facebook is attempting to generate a media preview, will return or redirect the request to a document that includes meta tags for defining parameters of the page. A meta tag (or any suitable metadata mechanism) preferably specifies an embeddable purchase interface. Facebook then will use the specified embeddable purchase interface as the media preview displayed in the Facebook post. When a friend, fan, follower, or other social network entity sees the post on Facebook, the user will be able to directly see the embeddable purchase interface in the media preview of the post—the user can fill in the billing information directly in the Facebook newsfeed. As another approach, the user may click the link that is in the body of the post. This will preferably result in the user being redirected to a Facebook application page of the online commerce platform. A product purchase interface is preferably displayed on this page and configured to complete the checkout of the associated item within that app. In this scenario, a product was shared, advertised and purchased with the user never leaving the Facebook experience; despite the fact that the selling entity was an outside party. Additionally, as the system and method works adapts to how the link is accessed, if another user shares the post or link again on Facebook or on a different social network or website, the link will still enable the adaptive product purchase interface.

In another exemplary implementation scenario, a merchant may register a product through an account interface on a website or application of the online commerce platform. A product link is then shared with the merchant through the interface. The merchant then shares the link in a post on Twitter (or any other social network), possibly using the sharing interface. Twitter may use a similar approach as above to generate a preview in a Twitter card or some other media preview GUI (graphical user interface) element. A meta tag is similarly specified in a returned document to target Twitter so that an embeddable purchase interface is used as a media preview. When a follower or user sees the tweet with the link, the user may expand the tweet to see the preview. When the tweet preview is visible, the embeddable purchase interface may be used directly in the Twitter interface to securely purchase the associated product. As another approach, the user may click the link in the tweet. Since Twitter may not support channel applications, the online commerce platform preferably directs the user to a page of the online commerce platform. The webpage may be styled and include Twitter related functionality in a manner similar to the Twitter website or application. After completing the purchase, a browser may redirect to the originating homepage or application. These exemplary scenarios for Facebook and Twitter may alternatively be implemented in any suitable manner.

The system and methods of the preferred embodiment and variations thereof can be embodied and/or implemented at least in part as a machine configured to receive a computer-readable medium storing computer-readable instructions. The instructions are preferably executed by computer-executable components preferably integrated with the online commerce platform. The computer-readable medium can be stored on any suitable computer-readable media such as RAMs, ROMs, flash memory, EEPROMs, optical devices (CD or DVD), hard drives, floppy drives, or any suitable device. The computer-executable component is preferably a general or application specific processor, but any suitable dedicated hardware or hardware/firmware combination device can alternatively or additionally execute the instructions.

As a person skilled in the art will recognize from the previous detailed description and from the figures and claims, modifications and changes can be made to the preferred embodiments of the invention without departing from the scope of this invention defined in the following claims.

What is claimed is:

1. A method for providing online commerce comprising:
   at an online commerce platform supported on a set of servers, storing a product profile for selling;
   providing a URI link of the online commerce platform that is unique to the product profile;
   at the online commerce platform, receiving an HTTP request to the link;
   identifying a referral channel of the HTTP request;
   conditionally selecting a product purchase interface mode from a set of interface modes at least in part based on the referral channel;
   transmitting a response of the selected product purchase interface mode in reply to the HTTP request comprising; when the referral channel is identified as a first social network, redirecting to a product purchase interface implemented within an account of a first social network; when the referral channel is identified as a media preview request of a social network, responding with a product purchase interface on a page of the online commerece platform, wherein the product purchase interface on a page of the online commerce platform comprises open graph meta data tags that specify an embeddable purchase interface and providing the embeddable purchase interface upon receiving an HTTP request of channel; when the referral channel is identified as having no targeted product purchase mode, responding with a product purchase interface on a page of the online commerce platform; and
   at the purchase interface, completing a purchase from the product purchase interface.

2. The method of claim 1, wherein transmitting a response of the selected product purchase interface mode further comprises redirecting to a product purchase interface implemented within an account page on the referring channel if a first product purchase mode is selected.

3. The method of claim 2, wherein the product purchase interface on the account page on the referring channel comprises a browser frame to a page of the online commerce platform, wherein the page of the browser frame is secured through a security certificate.

4. The method of claim 2, wherein transmitting a response of the selected product purchase interface mode further comprises responding with a product purchase interface on a page of the online commerce platform if a second product purchase mode is selected.

5. The method of claim 4, wherein responding with a product purchase interface on a page of the online commerce platform comprises rendering the product purchase interface with a template according to the referring channel.

6. The method of claim 4, wherein responding with a product purchase interface on a page of the online commerce platform comprises including meta data tags that specify an embeddable purchase interface in a response to at least one referral channel; and providing the embeddable purchase interface upon receiving an HTTP request of channel.

7. The method of claim 6, wherein the embeddable purchase interface is configured for seamless display within a content stream in the referral channel.

8. The method of claim 7, wherein the meta tag is in a header of an HTML document response and is an open graph meta tag that specifies a URI of the embeddable purchase interface, and wherein the embeddable purchase interface is a flash media file configured for implementing an interactive purchase interface.

9. The method of claim 8, wherein the embeddable purchase interface is secured through a security certificate.

10. The method of claim 6, wherein at the purchase interface completing a purchase comprises detecting account authentication status within the purchase interface; collecting billing information if billing information is not stored for detected account; and confirming purchase.

11. The method of claim 6, further comprising detecting a social network account identity, and identifying an account on the online commerce platform associated with the social network account identity; and using previously collected billing information.

12. The method of claim 1, further detecting a post that includes the link in a post on a referral channel; and monitoring actions taken within the referral channel on the post for a purchase action, and if a purchase action is executed by an account initiating a purchase process for the product.

13. The method of claim 1, further comprising providing a sharing interface with sharing options of a set of online channels, which includes at least a first online channel and a second online channel; and transmitting at least the URI link in a publication request to at least one of the online channels.

14. A method for providing shopping interface in an outside channel comprising:
   providing a URI link of an online commerce platform that is unique to a product profile, the online commerce platform run on a set of servers;
   at the online commerce platform, receiving an HTTP request to the link from a first outside channel;
   generating a product purchase interface response that comprises meta data tags that specify an embeddable purchase interface URI, the meta tag comprising a purchase related meta tag that reference of purchase service usable by the outside channel;
   transmitting the product purchase interface response in reply to the HTTP request;
   transmitting the embeddable purchase interface in reply to a second HTTP request of the first outside channel, wherein the embeddable purchase interface is configured for display within the content of the first outside channel; and at the embeddable purchase interface, completing a purchase of the product.

15. The method of claim 14, wherein the meta tag is a video meta tag that references a flash file configured for displaying a product purchase interface.

16. The method of claim 14, wherein the embeddable purchase interface is secured through a security certificate.

17. A method for providing multiple shopping interfaces comprising:
  at an online commerce platform supported on a set of servers, storing a product profile for selling;
  assigning a unique product URI link to the product profile;
  providing sharing interface with sharing options of a set of online channels, which includes at least a first online channel and a second online channel,
  transmitting at least the product URI link in a publication request to at least one of the online channels;
  receiving an HTTP request to the link;
  identifying a referral channel of the HTTP request;
  when the referral channel is identified as a first online channel, redirecting to a product purchase interface implemented within an account on the referring channel in a response to the HTTP request;
  when the referral channel is identified as the second online channel, responding with a product purchase interface on a page of the online commerce platform in response to the HTTP request, wherein the product purchase interface is customized according to a template of the second online channel;
  when the referral channel is identified as not in the set of online channels, responding with a product purchase interface on a page of the online commerce platform in response to the HTTP request, wherein the product purchase interface is formatted according to a default template;
  completing a purchase from the product purchase interface;
  detecting a post that includes the link in a post on a referral channel;
  monitoring actions taken within the referral channel on the post for a purchase action; and
  initiating a purchase process for the product if a purchase action is executed by an account.

18. The method of claim 17, if the referral channel is a third online channel, responding with a product purchase interface HTML document that specifies a meta tag that references an embeddable purchase interface; and providing the embeddable purchase interface, wherein the embeddable purchase interface is a product purchase interface for display within the content of the third online channel.

* * * * *